(12) United States Patent
Sudermann

(10) Patent No.: US 8,585,794 B2
(45) Date of Patent: Nov. 19, 2013

(54) AIR FILTER INSERT

(75) Inventor: Arthur Sudermann, Ditzingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 187 days.

(21) Appl. No.: 13/128,767

(22) PCT Filed: Nov. 11, 2009

(86) PCT No.: PCT/EP2009/064983
§ 371 (c)(1),
(2), (4) Date: May 18, 2011

(87) PCT Pub. No.: WO2010/055054
PCT Pub. Date: May 20, 2010

(65) Prior Publication Data
US 2011/0219737 A1    Sep. 15, 2011

(30) Foreign Application Priority Data

Nov. 13, 2008   (DE) .................... 20 2008 015 078 U

(51) Int. Cl.
*B01D 39/00*    (2006.01)

(52) U.S. Cl.
USPC ............. 55/497; 55/495; 55/500; 55/521; 55/522; 55/502

(58) Field of Classification Search
USPC ............ 55/480–481, 486, 495, 497, 500, 55/502–503, 522, 524, 528, 304
See application file for complete search history.

(56) References Cited

U.S. PATENT DOCUMENTS

| 6,039,779 A | 3/2000 | Butz et al. |
| 6,830,443 B1 * | 12/2004 | Coffey et al. ................. 425/116 |
| 7,258,718 B2 | 8/2007 | Dworatzel et al. |
| 7,442,221 B2 | 10/2008 | Ruhland et al. |
| 2004/0020177 A1 | 2/2004 | Ota et al. |
| 2004/0194441 A1 | 10/2004 | Kirsch |
| 2006/0080949 A1 | 4/2006 | Moriyama et al. |

FOREIGN PATENT DOCUMENTS

| DE | 9116336 U1 | 9/1991 |
| DE | 202005009836 U1 | 11/2006 |
| EP | 0486846 A1 | 5/1992 |
| EP | 0863785 B1 | 8/2000 |
| EP | 1310709 A2 | 5/2003 |
| EP | 1380334 A1 | 1/2004 |

OTHER PUBLICATIONS

PCT search report for internaltion application PCT/EP2009/064983.

* cited by examiner

*Primary Examiner* — Robert Clemente
*Assistant Examiner* — Karla Hawkins
(74) *Attorney, Agent, or Firm* — James Hasselbeck

(57) ABSTRACT

An air filter insert with a folded filter medium is provided along a side edge with a sealing element which is composed of a first contact section which extends in axial direction and a second contact section which extends in radial direction, the two contact sections being applied directly to the side edge of the filter medium.

12 Claims, 1 Drawing Sheet

AIR FILTER INSERT

CROSS REFERENCE TO RELATED APPLICATIONS

This application is US National Stage Entry of international patent application no. PCT/EP2009/064983, filed Nov. 1, 2009 designating the United States of America, the entire disclosure of which is incorporated herein by reference. Priority is claimed based on Federal Republic of Germany application no. 20 2008 015 078.7, filed Nov. 13, 2008.

TECHNICAL FIELD

The invention concerns an air filter insert preferably as a component of an air filtering device for purifying air.

PRIOR ART

EP 0 863 785 B1 discloses an air filter device that is used, for example, for filtration of the intake air to be supplied to an internal combustion engine. The air filter device comprises an air filter insert that is comprised of a folded filter medium that is framed by a frame wherein the frame comprises circumferentially extending sealing pockets with cast-in silicone foam seal. The silicone foam is separated from the filter medium by a sidewall of the sealing pocket in the frame wherein a portion of the silicone foam extends into the axial area of the filter medium.

Based on this prior art, it is an object of the invention to configure an air filter insert in a material-saving way such that a reliable sealing action is provided in the inserted state of the air filter insert.

SUMMARY OF THE INVENTION

The air filter insert according to the invention is preferably used for the filtration of intake air of internal combustion engines. In principle, an application, for example, for the filtration of the air that is to be supplied to the passenger compartment can also be considered.

The air filter insert is a component of an air filter device that comprises a housing with a housing cover wherein in the mounted state the externally positioned sides of the contact sections of the sealing element, located immediately on the filter medium of the air filter insert, rest seal-tightly against sealing surfaces on the inner side of the housing or the cover. According to the invention, it is provided that the filter medium, which is flowed through by the gaseous fluid to be purified, is embodied preferably as a paper filter and is folded in a zigzag shape wherein on at least one lateral edge of the folded filter medium a sealing element is arranged for sealing purposes that comprises a first contact section extending in axial direction and a second contact section that is extending in radial direction (transverse to the axial direction). The two contact sections of the sealing element are contiguous and are applied immediately on the lateral edge of the filter medium wherein the externally positioned sides of the contact sections of the sealing element form contact surfaces for the housing or the cover of the air filter device.

The sealing element embodied in this way is in cross-section of an angled shape wherein the two legs each have a contact section for contacting the inner side of the housing or the inner side of the cover.

This embodiment has various advantages. The contact sections of the sealing element extending in axial direction and in radial direction, in the mounted state with the cover attached, are force-loaded in axial direction as well as in radial direction and therefore compressed so that a very good seal-tightness is provided and leakage flows between the raw side and the clean side are safely prevented. The improved seal-tightness is achieved at the same time with a reduced material expenditure for the sealing element because, as a result of the compressing action of the sealing element in two directions that are perpendicular to each other, the receiving space for the sealing element is filled out better. Smaller sealing cross-sections in comparison to the embodiments of the prior art can be realized without this affecting negatively the seal-tightness.

A further advantage resides in the immediate application of the sealing element on the material of the folded filter medium. This is realized in particular by application of the sealing element material on the filter medium by means of casting molds so that an additional frame that frames the filter medium is in principle obsolete. Since the sealing material not only extends along the radial external side of the filter medium but partially with one leg or contact section also within the rim area of the axial end face, an additional stabilization and strengthening of the filter medium is achieved.

According to a further embodiment, it can be expedient to provide a filter frame wherein in this case also the sealing element is applied expediently immediately onto the filter medium.

According to an expedient further embodiment it is provided that the contact sections of the filter element are provided with flattened edges. Such flattened portions can be provided in the area of the respective free end faces of the contact sections as well as in the transition area between the first and second contact section.

The filter element is preferably of a rectangular or e.g. also trapezoidal shape and may optionally have a slanted portion on one side wherein sealing elements each provided with a first and a second contact section extend expediently along at least two oppose lateral surfaces, in particular across the longitudinal sides of the filter medium. Optionally, a circumferentially extending sealing element is provided that on all four lateral surfaces of the filter medium has the same cross-section. In an alternative embodiment it is however also possible that only two opposed lateral surfaces of the filter medium are provided with the sealing element according to the invention while the two further lateral surfaces of the filter medium are provided with a sealing element with an alternative cross-section that, for example, is provided with a notch with which the sealing element at this location can be pushed onto a carrier edge on the housing.

At least one transverse rib can be formed monolithically with the housing and/or the cover that extends between opposed sealing surfaces on the housing or the cover which are contacting the contact sections of the sealing elements in the mounted state. The transverse rib serves for absorbing the force that is generated between the seal and the housing or the cover in a better way and for preventing deformation of the housing or the cover. In this way, a better seal-tightness for a long operating time is ensured.

The sealing element is comprised expediently of polyurethane foam (PUR) which is cast onto the side of the filter medium.

BRIEF DESCRIPTION OF THE DRAWINGS

Further advantages and expedient embodiments can be taken from the further claims, the figure description and the drawings. It is shown in:

In the Figures same components are provided with the same reference characters.

Embodiment(s) Of The Invention

Figure 1:
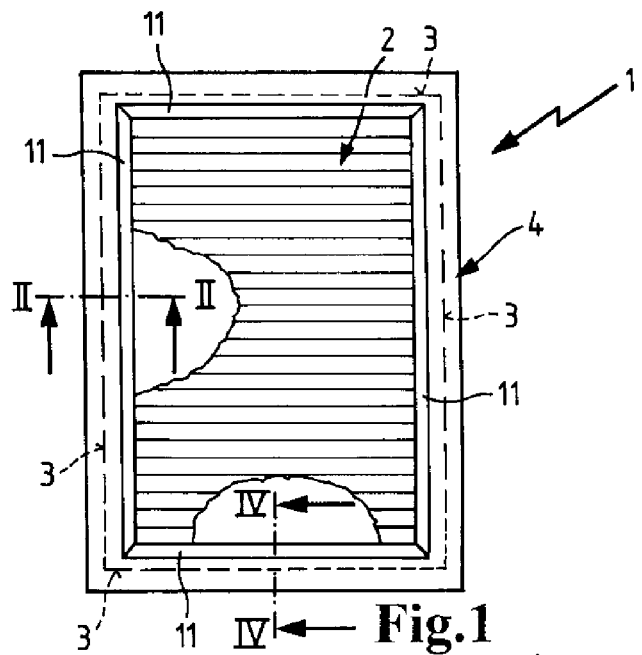
FIG. 1 a plan view onto an air filter insert that is comprised of a folded filter medium wherein the lateral edges of the filter medium are provided with a circumferentially extending sealing element.

In FIG. 1 an air filter insert 1 for an air filter device is illustrated that is used in particular for filtration of the intake air in internal combustion engines. The air filter insert 1 is comprised of a filter medium 2 that is embodied as a folded filter paper and has on its lateral edges 3 a circumferentially extending sealing element 4. The air filter insert 1 is of a rectangular shape wherein a sealing element 4 is arranged on the longitudinal sides as well as on the narrow sides.

Figure 2:
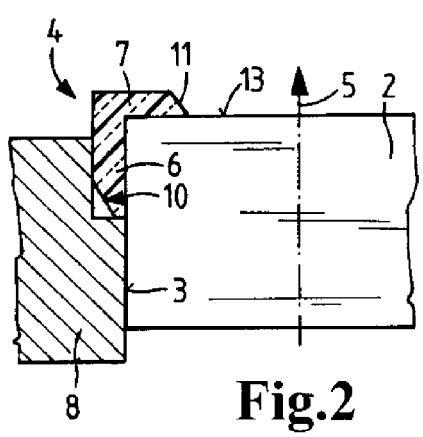
FIG. 2 a section view according to section line II-II of FIG. 1 through the sealing element in the area of the longitudinal side, with the housing into which the air filter insert is inserted indicated in dashed lines.
Figure 3:
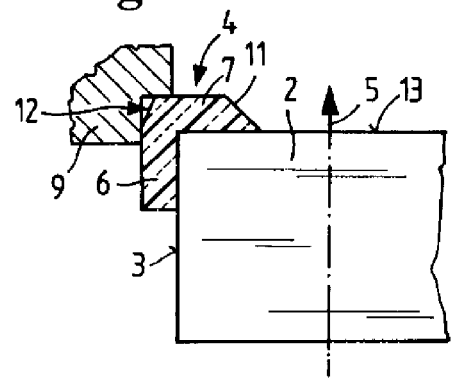
FIG. 3 also a section view according to section line II-II of FIG. 1 but with a cover indicated in dashed lines.

FIGS. 2 and 3 show section illustrations through the sealing element 4 according to section line II-II of FIG. 1 in the area of the longitudinal sides of the air filter insert. The filter medium 2, as illustrated by arrow 5 shown in dashed line, is flowed through axially by the gaseous fluid to be purified. The sealing element 4 is comprised of two contiguous, monolithically formed, leg-shaped contact sections 6 and 7 that immediately rest on the external side of the lateral edge 3 or the topside 13 that at the same time defines the clean side of the filter element 2. Thus, the sealing element 4 along the longitudinal side of the filter medium has an angled cross-section wherein the two leg-shaped contact sections 6 and 7 have at least approximately the same length. The sealing element 4 is comprised preferably of PUR foam and is in particular cast onto the lateral edge 3.

The edges of the sealing element 4 can have bevels 10, 11, 12 which facilitate insertion into receiving shoulders which are provided in the housing 8 or in the cover 9. Moreover, the space in the receiving shoulders is not filled completely as a result of the bevels in the undeformed state of the sealing element and only with axial and radial compression of the sealing element will be filled in that the material of the sealing element will expand toward the remaining wall sections. In the embodiment, such bevels or chamfers 10, 11, 12 can be provided at the free end face of the contact section 6 extending in the axial direction, at the free end face of the second contact section 7 extending in the radial direction, as well as at the transition area between the two contact sections 6, 7. In particular the bevels 10 and 12 have the function of mounting aids because mounting as a result of the bevels is facilitated.

In the mounted state, as shown in FIG. 2, the lower part of the contact section 6 extending in axial direction is loaded by a shoulder in the housing 8 in the axial direction as well as transversely thereto, i.e., in the radial direction, by a clamping force. As can be seen in FIG. 3, the cover 9 is acting on the upper part of the contact section 6 extending in the axial direction as well as onto the second contact section 7 extending perpendicularly thereto in the radial direction wherein the sealing element 4 is loaded by a shoulder in the cover in the axial direction as well as in the radial direction by a clamping force.

Figure 4:
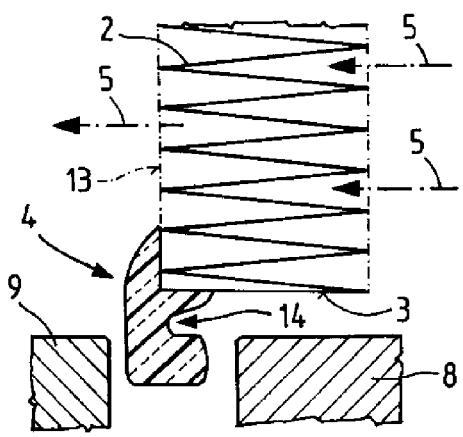
FIG. 4 a section view according to section line IV-IV of FIG. 1 in the area of the narrow side of the air filter insert.

FIG. 4 shows a section view according to section line IV-IV through the narrow side of the air filter insert wherein the sealing element 4 is provided with an alternative cross-section. The sealing element 4 is also cast at this side onto the upper edge 13 of the filter medium 2; it has a cross-section into which a notch 14 is introduced with which the sealing element 4 can be pushed onto a carrier edge (not illustrated), in particular on the housing 8.

Optionally, the sealing element 4 is however also embodied on the longitudinal side of the filter medium in the way as illustrated in FIGS. 2 and 3.

The invention claimed is:

1. An air filter insert comprising:
    a folded filter medium which is flowed through in an axial direction by a gaseous fluid to be purified, said folded filter medium including
        one or more lateral edge edges;
    a sealing element arranged on at least one of said lateral edges of said folded filter medium, said sealing element including
        a first leg-shaped contact section extending in an axial direction, arranged immediately on and secured onto said lateral edges of the filter medium, said first leg-shaped contact section including
            a first contact surface formed on an externally positioned side of said first leg-shaped contact section and extending is an axial direction;
        a second leg-shaped contact section extending in a radial direction, arranged immediately on a respective one said axial end faces of the filter medium and secured onto at least one of said lateral edges, said second leg-shaped contact section including
            a second contact surface formed on an externally positioned side of said second leg-shaped contact section and extending is a radial direction;
        wherein both said first and said second leg-shaped contact sections of said sealing element are affixed immediately onto said lateral edges,
        wherein said leg-shaped contact sections are monolithically and contiguously joined together at a first end;
        wherein a bevel surface is provided on an opposing second end of at least one of said leg-shaped contact sections.

2. The air filter insert according to claim 1, wherein said sealing element is directly injection-molded or cast onto said folded filter medium.

3. The air filter insert according to claim 1, wherein said sealing element is arranged on at least two sides of the rectangular filter element.

4. The air filter insert according to claim 1, wherein said sealing element is comprised of polyurethane foam (PUR).

5. The air filter insert according to claim 1, wherein on at least one side of said filter element a sealing element with alternative cross-section is arranged.

6. The air filter insert according to claim 1, wherein said sealing element with said alternative cross-section include a notch formed into the sealing element and extending in the joining or release direction of said cover,
    wherein said notch of said sealing element can be pushed onto a carrier edge on said housing.

7. An air filter device, comprising:
    an air filter insert including:
        a folded filter medium which is flowed through in an axial direction by a gaseous fluid to be purified, said folded filter medium including
            a first axial end face at a raw side of said filter medium;
            an opposing second axial end face at a clean side of said filter medium;

a plurality of lateral side edges of said filter medium, said lateral side edges extending between said first and second end faces at radial external sides of said filter medium;
a sealing element arranged on said lateral side edges of said folded filter medium, said sealing element including
a first leg-shaped contact section extending in an axial direction, immediately arranged on and secured onto said lateral side edges onto a radial external side of the filter medium, said first leg-shaped contact section including
a first contact surface formed on an externally positioned side of said first leg-shaped contact section and extending in an axial direction;
a second leg-shaped contact section extending in a radial direction, immediately arranged on a respective one said axial end faces of the filter medium and secured onto said respective one of said axial end faces of the filter medium, said second leg-shaped contact section including
a second contact surface formed on an externally positioned side of said second leg-shaped contact section and extending in a radial direction;
wherein said first and second leg-shaped contact sections are arranged immediately onto said filter medium;
wherein both said first and said second leg-shaped contact sections are affixed immediately onto said lateral side edges of said filter medium;
an air filter housing into which said air filter insert is installed;
a cover mating to said air filter housing;
wherein when said filter insert is in a mounted state in said housing and cover, said externally positioned contact surfaces of said contact sections of said sealing element rest seal-tightly on sealing surfaces on an inner side of said housing or said cover;
wherein said first contact surface is radially loaded by a respective one of said sealing surfaces with a radial clamping force, sealing radially between said filter insert and said housing or said cover;
wherein said second contact surface is axially loaded by a respective one of said sealing surfaces with an axial clamping force, sealing axially between said filter insert and said housing or said cover.

8. The air filter device according to claim 7, wherein
said housing and/or said cover includes
at least one transverse rib extending between oppositely positioned sealing surfaces on said housing or said cover.

9. An air filter insert comprising:
a folded filter medium of filter paper folded in a zigzag shape, said folded filter medium flowed through in an axial direction by a gaseous fluid to be purified, said folded filter medium including
a first axial end face at a raw side of said filter medium;
an opposing second axial end face at a clean side of said filter medium;
a plurality of lateral side edges of said filter medium, said lateral side edges extending between said first and second end faces at radial external sides of said filter medium;
a sealing element arranged on at least one of said lateral side edges of said folded filter medium, said sealing element including
a first leg-shaped contact section cast onto and extending along at least one of said lateral side edges of said filter medium in said axial direction;
a second leg-shaped contact section monolithic with said first contact section and extending in a radial direction along at least one of said axial end faces of said folded filter medium, said radial direction transverse to said axial direction,
wherein said sealing element with said first and said second contact sections is a one-piece monolithic component, said first and second contact sections providing said sealing element with an angled L-shaped cross section,
wherein both said first and said second contact sections of said sealing element are secured by casting immediately onto said at least one lateral edges,
wherein respective externally positioned sides of said contact sections of said sealing element form contact surfaces for a housing or a cover of an air filter device,
wherein said leg-shaped contact sections each have a first end at which they are monolithically and contiguously joined together, and
wherein a bevel surface is provided on an opposing second end of at least one of said leg-shaped contact sections.

10. The air filter insert according to claim 9, wherein
said sealing element further includes a radially outwardly extending seal portion monolithic with said first and second contact sections, said radially outwardly extending seal portion including an axially extending notch formed therein operable to engage a portion of said housing.

11. The air filter device according to claim 7, wherein
said sealing element includes a notch formed into the sealing element and extending in a joining or release direction of said cover,
wherein said notch of said sealing element can be pushed onto a carrier edge on said housing.

12. The air filter insert according to claim 9, wherein
said sealing element includes a notch formed into the sealing element and extending in a joining or release direction of said cover,
wherein said notch of said sealing element can be pushed onto a carrier edge on said housing.

* * * * *